(12) United States Patent
Giovanardi et al.

(10) Patent No.: US 10,875,375 B2
(45) Date of Patent: Dec. 29, 2020

(54) METHOD AND APPARATUS FOR CONTROLLING AN ACTUATOR

(71) Applicant: ClearMotion, Inc., Woburn, MA (US)

(72) Inventors: Marco Giovanardi, Melrose, MA (US); Brian Alexander Selden, Concord, MA (US); Jaganath Chandrasekar, Woburn, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 15/544,769

(22) PCT Filed: Jan. 22, 2016

(86) PCT No.: PCT/US2016/014565
§ 371 (c)(1),
(2) Date: Jul. 19, 2017

(87) PCT Pub. No.: WO2016/118887
PCT Pub. Date: Jul. 28, 2016

(65) Prior Publication Data
US 2018/0154728 A1     Jun. 7, 2018

Related U.S. Application Data

(60) Provisional application No. 62/107,897, filed on Jan. 26, 2015, provisional application No. 62/107,315, filed on Jan. 23, 2015.

(51) Int. Cl.
*B60G 17/018* (2006.01)
*B60G 17/04* (2006.01)
(Continued)

(52) U.S. Cl.
CPC ........... *B60G 17/018* (2013.01); *B60G 13/14* (2013.01); *B60G 17/016* (2013.01);
(Continued)

(58) Field of Classification Search
USPC .......................................................... 701/37
See application file for complete search history.

(56) References Cited

U.S. PATENT DOCUMENTS 4,033,423 A * 7/1977 Grosseau ................. B60G 7/04
180/41
4,350,354 A * 9/1982 Dotti ................... B60G 17/0272
267/187
(Continued)

FOREIGN PATENT DOCUMENTS

DE       199 20 109 A1   11/2000
DE   10 2004 056610 A1   6/2006
(Continued)

OTHER PUBLICATIONS

Furutani, M. Urushibata and N. Mohri, Improvement of control method for piezoelectric actuator by combining induced charge feedback with inverse transfer function compensation, Proceedings. 1998 IEEE International Conference on Robotics and Automation (Cat. No. 98CH36146) (May 20, 1998)( https://ieeexplore.ieee.org.*
(Continued)

*Primary Examiner* — Jean Paul Cass
(74) *Attorney, Agent, or Firm* — Wolf, Greenfield & Sacks, P.C.

(57) ABSTRACT

At least one controller configured to control an actuator of an active suspension system. The at least one controller includes circuitry configured to determine an actuator state, and apply the actuator state and a commanded state to an inverse model of the actuator to produce an actuator command. The circuitry is configured to produce the actuator command by a process that includes performing low pass filtering and phase compensation to correct a phase introduced by the low pass filtering.

11 Claims, 11 Drawing Sheets

(51) Int. Cl.

| | | |
|---|---|---|
| B60G 13/14 | (2006.01) | |
| F16F 9/46 | (2006.01) | |
| B60G 17/0165 | (2006.01) | |
| F16F 9/18 | (2006.01) | |
| F16F 15/00 | (2006.01) | |
| B60G 17/015 | (2006.01) | |
| B60G 17/016 | (2006.01) | |
| B60G 17/019 | (2006.01) | |

(52) U.S. Cl.
CPC ....... *B60G 17/019* (2013.01); *B60G 17/0152* (2013.01); *B60G 17/0165* (2013.01); *B60G 17/0182* (2013.01); *B60G 17/04* (2013.01); *F16F 9/18* (2013.01); *F16F 9/46* (2013.01); *F16F 15/002* (2013.01); *B60G 2202/413* (2013.01); *B60G 2202/416* (2013.01); *B60G 2204/112* (2013.01); *B60G 2300/60* (2013.01); *B60G 2400/102* (2013.01); *B60G 2400/202* (2013.01); *B60G 2400/252* (2013.01); *B60G 2400/5182* (2013.01); *B60G 2400/64* (2013.01); *B60G 2400/91* (2013.01); *B60G 2500/02* (2013.01); *B60G 2600/181* (2013.01); *B60G 2600/182* (2013.01); *B60G 2600/188* (2013.01); *B60G 2600/604* (2013.01); *B60G 2600/85* (2013.01); *B60G 2800/162* (2013.01); *B60G 2800/916* (2013.01)

(56) References Cited

U.S. PATENT DOCUMENTS

| | | | |
|---|---|---|---|
| 4,625,993 A | 12/1986 | Williams et al. | |
| 5,028,073 A | 7/1991 | Harms et al. | |
| 5,062,673 A * | 11/1991 | Mimura | B25J 15/0009 294/106 |
| 5,289,379 A | 2/1994 | Williams | |
| 5,329,767 A | 7/1994 | Hewett | |
| 5,682,980 A | 11/1997 | Reybrouck | |
| 5,767,648 A * | 6/1998 | Morel | B25J 9/1628 318/568.1 |
| 5,862,894 A | 1/1999 | Boichot et al. | |
| 6,519,939 B1 | 2/2003 | Duff | |
| 7,051,526 B2 | 5/2006 | Geiger | |
| 7,631,736 B2 | 12/2009 | Thies et al. | |
| 7,770,701 B1 * | 8/2010 | Davis | C10M 171/001 188/267.1 |
| 7,963,529 B2 * | 6/2011 | Oteman | B60G 13/001 188/266 |
| 8,776,961 B2 | 7/2014 | Mori et al. | |
| 9,108,484 B2 | 8/2015 | Reybrouck | |
| 9,550,404 B2 * | 1/2017 | Giovanardi | F15B 13/0444 |
| 2002/0128072 A1 | 9/2002 | Terpay et al. | |
| 2003/0077183 A1 | 4/2003 | Franchet et al. | |
| 2005/0098399 A1 | 5/2005 | Bremner | |
| 2007/0089924 A1 | 4/2007 | de la Torre et al. | |
| 2007/0233279 A1 | 10/2007 | Kazerooni et al. | |
| 2008/0190104 A1 | 8/2008 | Bresie | |
| 2008/0257626 A1 | 10/2008 | Carabelli et al. | |
| 2009/0091094 A1 * | 4/2009 | Sano | B60G 21/0555 280/5.511 |
| 2009/0107378 A1 * | 4/2009 | Duquette | B63B 17/0081 114/55.57 |
| 2009/0112423 A1 * | 4/2009 | Foster | F16H 61/0031 701/60 |
| 2009/0230688 A1 * | 9/2009 | Torres | F03D 15/00 290/55 |
| 2009/0234537 A1 * | 9/2009 | Tomida | B60G 17/0162 701/38 |
| 2009/0260935 A1 * | 10/2009 | Avadhany | B60G 13/14 188/297 |
| 2010/0013229 A1 * | 1/2010 | Da Costa | F03B 13/187 290/53 |
| 2010/0044978 A1 * | 2/2010 | Delorenzis | B60G 17/0432 280/5.519 |
| 2010/0072760 A1 * | 3/2010 | Anderson | B60G 13/14 290/1 R |
| 2010/0115936 A1 * | 5/2010 | Williamson | E02F 9/2207 60/327 |
| 2010/0217491 A1 * | 8/2010 | Naito | B60C 3/06 701/49 |
| 2010/0262308 A1 * | 10/2010 | Anderson | B60G 13/14 700/287 |
| 2011/0024601 A1 * | 2/2011 | Shoemaker | B60N 2/501 248/636 |
| 2011/0057478 A1 * | 3/2011 | Van der Knaap | B60G 99/008 296/190.07 |
| 2011/0127127 A1 * | 6/2011 | Hirao | B60G 17/08 188/266.2 |
| 2011/0162903 A1 * | 7/2011 | Stragier | B60K 6/12 180/165 |
| 2011/0303049 A1 * | 12/2011 | Neelakantan | F16H 61/0021 74/733.1 |
| 2012/0010780 A1 * | 1/2012 | Hayashi | B60G 17/018 701/37 |
| 2012/0055745 A1 * | 3/2012 | Buettner | B60G 17/0161 188/266.2 |
| 2012/0067037 A1 * | 3/2012 | Bohrer | A01D 41/1274 60/450 |
| 2012/0078470 A1 * | 3/2012 | Hirao | B60G 17/08 701/38 |
| 2012/0143212 A1 * | 6/2012 | Madhani | B25J 9/1689 606/130 |
| 2012/0230850 A1 * | 9/2012 | Kawano | F04C 11/008 417/410.1 |
| 2012/0233991 A1 * | 9/2012 | Ivantysynova | F15B 1/024 60/327 |
| 2012/0305347 A1 * | 12/2012 | Mori | B60G 17/08 188/266.2 |
| 2012/0316738 A1 * | 12/2012 | Teslak | B60W 10/115 701/53 |
| 2013/0081382 A1 * | 4/2013 | Nelson | F15B 11/024 60/327 |
| 2013/0147205 A1 * | 6/2013 | Tucker | F01C 1/103 290/1 A |
| 2013/0221625 A1 * | 8/2013 | Pare | B60G 11/27 280/5.514 |
| 2013/0264158 A1 * | 10/2013 | Hall | F16F 9/187 188/313 |
| 2014/0095022 A1 * | 4/2014 | Cashman | B60N 2/501 701/37 |
| 2014/0214274 A1 * | 7/2014 | Liu | B60G 17/015 701/38 |
| 2014/0260233 A1 * | 9/2014 | Giovanardi | F15B 13/0444 60/431 |
| 2014/0265168 A1 | 9/2014 | Giovanardi et al. | |
| 2014/0265170 A1 | 9/2014 | Giovanardi et al. | |
| 2014/0271066 A1 * | 9/2014 | Hou | F15B 11/17 414/408 |
| 2014/0288776 A1 * | 9/2014 | Anderson | B60G 17/016 701/37 |
| 2014/0294625 A1 | 10/2014 | Tucker et al. | |
| 2014/0297117 A1 * | 10/2014 | Near | H02K 5/12 701/37 |
| 2015/0059325 A1 * | 3/2015 | Knussman | E02F 9/2217 60/327 |
| 2015/0192114 A1 * | 7/2015 | Triebel | B60G 17/08 290/1 A |
| 2015/0224845 A1 * | 8/2015 | Anderson | B60G 17/019 701/37 |
| 2016/0059664 A1 * | 3/2016 | Tucker | B60G 17/04 280/124.159 |

FOREIGN PATENT DOCUMENTS

| | | |
|---|---|---|
| DE | 10 2010 023434 A1 | 12/2011 |
| WO | WO 2010/066416 A1 | 6/2010 |

(56) References Cited

FOREIGN PATENT DOCUMENTS

| WO | WO 2011/159874 A2 | 12/2011 |
| WO | WO 2014/145018 A2 | 9/2014 |

OTHER PUBLICATIONS

Google Translation of RUU 2448000C2 to ТОМОМиТ и НАКАМУРА (JP) ТОМОМиТи НАКАМУРА entitled "Automotive suspension system with electromagnetic drive"; (published Apr. 20, 2012)(https://patents.google.com/patent/RU2448000C2/en?q=suspension&q=inverse-transfer&q=function&q=differential&q=force&oq=suspension+and+inverse-t).*
Google Machine Translation of Russian Patent RU2448000C2 (2008).*

* cited by examiner

METHOD AND APPARATUS FOR CONTROLLING AN ACTUATOR

CROSS REFERENCE TO RELATED APPLICATIONS

This application is a National Stage filing under 35 U.S.C. § 371 of International Application No. PCT/US2016/014565, filed Jan. 22, 2016, which claims the benefit of U.S. Provisional Application No. 62/107,315, filed Jan. 23, 2015, entitled "METHOD AND APPARATUS FOR CONTROLLING AN ACTUATOR", and U.S. Provisional Application No. 62/107,897, filed Jan. 26, 2015, entitled "METHOD AND APPARATUS FOR CONTROLLING AN ACTUATOR", each of which is hereby incorporated by reference in its entirety.

BACKGROUND

An actuator system may be interposed between two or more elements of a structure and configured to react to stimuli induced by the surroundings, forces or relative movement among the two or more elements of the structure, and/or commands of a controller. For example, an active suspension system may be used to interface between the unsprung mass and the sprung mass of a road vehicle such as, for example, an automobile, a van, a truck, a tank, and a railroad car. Active suspension actuator systems may be controlled to, for example, achieve a desired response to various road stimuli.

SUMMARY

Some embodiments relate to an apparatus that includes an actuator system with at least one element that has inertia and at least one element that has compliance. The actuator system also includes a controller configured and constructed to receive an input and produce an actuator command that requests the actuator to produce an output. The command at least partially compensates for at least one of the effect of the inertia of the at least one element and the effect of the compliance of the at least one element, such that the response of the system is improved.

Some embodiments relate to an actuator system that includes an actuator which is non ideal and with system dynamics, which is disposed between a first element and a second element of a structure, wherein the first element is exposed to an external stimulus. The actuator system also includes at least one sensor that senses an aspect of the external stimulus and a controller configured to employ a control algorithm that delivers a command input to the actuator. The command input at least partially compensates for the effect of at least one aspect of the actuator dynamics to at least partially isolate the second element from an effect of the external stimulus on the first element based at least partially on an output of the sensor, and at least partially compensates for the effect of at least one aspect of the actuator system dynamics in order to improve the accuracy of the control system.

Some embodiments relate to a method that includes fabricating an active suspension actuator with a controller; measuring at least one performance parameter of at least one component of the active suspension actuator during the fabrication process and calibrating at least one control parameter in an algorithm residing in the controller, during the fabrication process, wherein the at least one control parameter setting is specific to the active suspension actuator and based on the measured at least one performance parameter.

Some embodiments relate to at least one controller configured to control an actuator of an active suspension system, the at least one controller including circuitry configured to: determine an actuator force and apply the actuator force and a commanded force to an inverse model of the actuator to produce an actuator force command. The circuitry is configured to produce the actuator force command by performing low pass filtering and phase compensation to correct a phase introduced by the low pass filtering.

Some embodiments relate to a method of controlling an actuator of an active suspension system. The method includes determining an actuator force and applying the actuator force and a commanded force to an inverse model of the actuator to produce an actuator force command. The actuator force command is produced by performing low pass filtering and phase compensation to correct a phase introduced by the low pass filtering. Some embodiments relate to a non-transitory computer readable storage medium having stored thereon instructions, which, when executed by a processor, perform the method.

Some embodiments relate to at least one controller configured to control an actuator of an active suspension system, the at least one controller including circuitry configured to: determine an actuator state and apply the actuator state and a commanded state to an inverse model of the actuator to produce an actuator command. The circuitry is configured to produce the actuator command by a process that includes performing low pass filtering and phase compensation to correct a phase introduced by the low pass filtering.

Some embodiments relate to a method of controlling an actuator of an active suspension system, the method including determining an actuator state and applying the actuator state and a commanded state to an inverse model of the actuator to produce an actuator command. The actuator command is produced by performing a process that includes low pass filtering and phase compensation to correct a phase introduced by the low pass filtering. Some embodiments relate to a non-transitory computer readable storage medium having stored thereon instructions, which, when executed by a processor, perform the method.

U.S. Pat. Nos. 8,392,030, 8,839,920, 8,840,118, 8,841,786, which disclose various aspects and methods and operation of actuators and their control, are hereby incorporated herein by reference in their entirety. International Application PCT/US2014/027389, which discloses various aspects of the construction and operation of diverter valves, is hereby incorporated herein by reference in its entirety.

The foregoing summary is provided by way of illustration and is not intended to be limiting.

BRIEF DESCRIPTION OF THE DRAWINGS

The foregoing summary, including the above and other features and advantages of the actuator control system and method, as well as a brief description of the preferred embodiments of the inventions will be better understood when read in conjunction with the appended drawings. For the purpose of illustrating one or more embodiments of the present inventions, and to explain their operation, drawings and schematic illustrations are shown. It should be understood, however, that the invention(s) are not limited to the precise arrangements, variants, structures, features, embodiments, aspects, methods, advantages, improvements and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods and instrumentalities. In the drawings:

FIG. 2 shows a schematic illustration of the implementation of an actuator system control algorithm and a block diagram of the actuator system it is attached to.

Figure 3A:
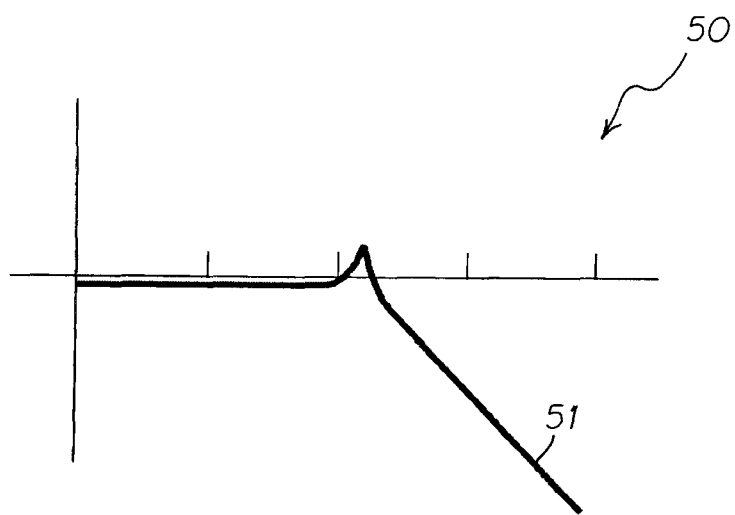
FIG. 3a shows a Bode plot of the transfer function of an actuator.
Figure 3B:
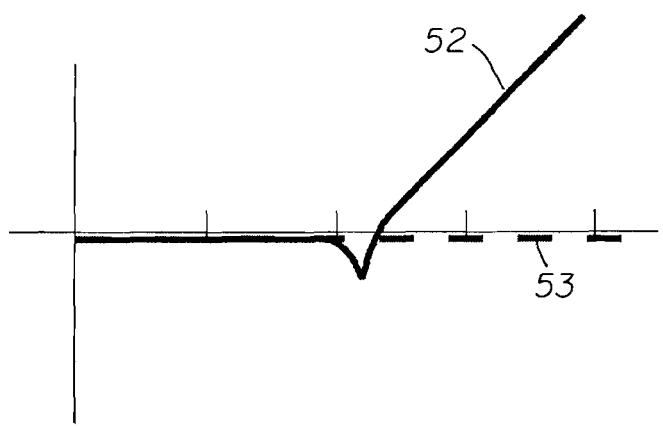
FIG. 3b shows a Bode plot of the inverse transfer function of the actuator transfer function in FIG. 3a and the idealized combined response of the controller and the actuator.
Figure 3C:
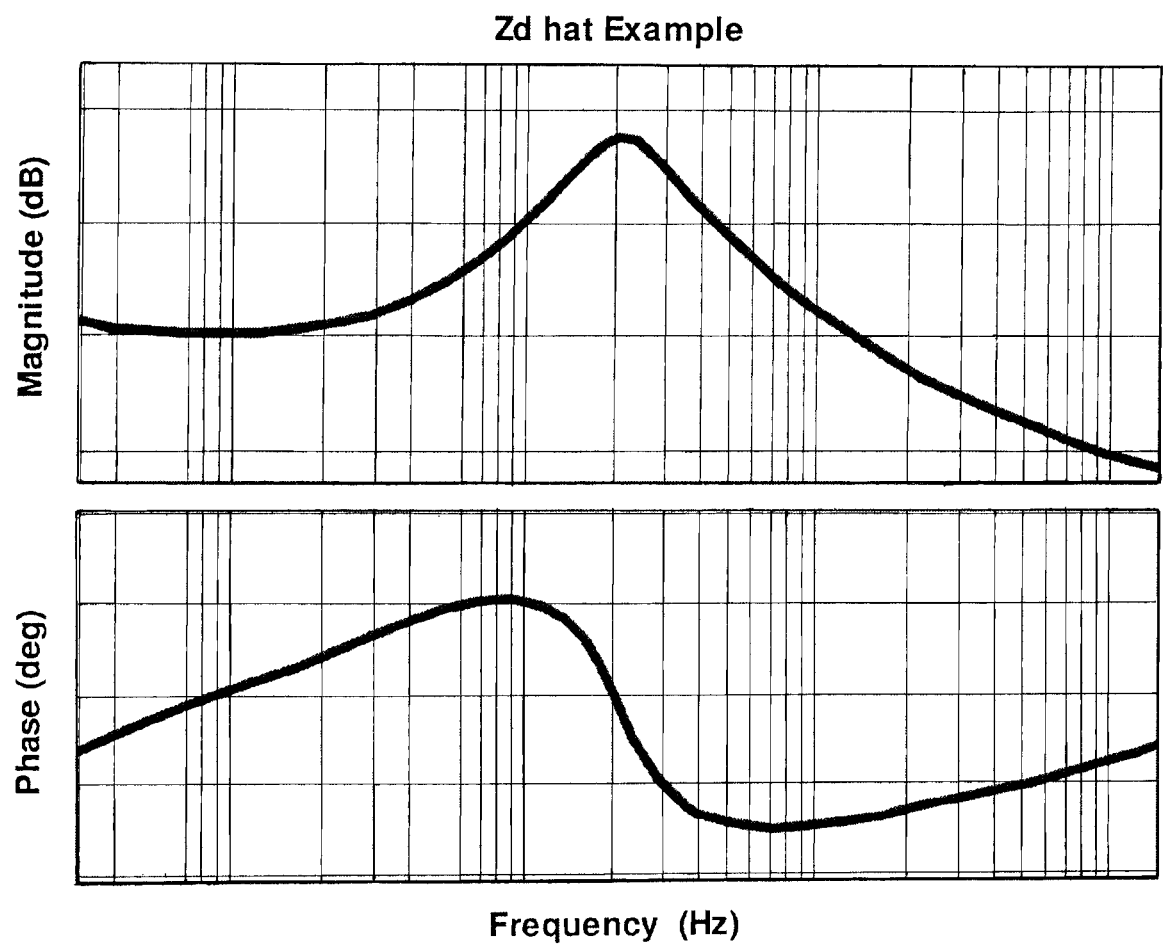

A plot of the magnitude and phase of an exemplary transfer function $\hat{Z}_d$ is shown in FIG. 3c.

Figure 3D:
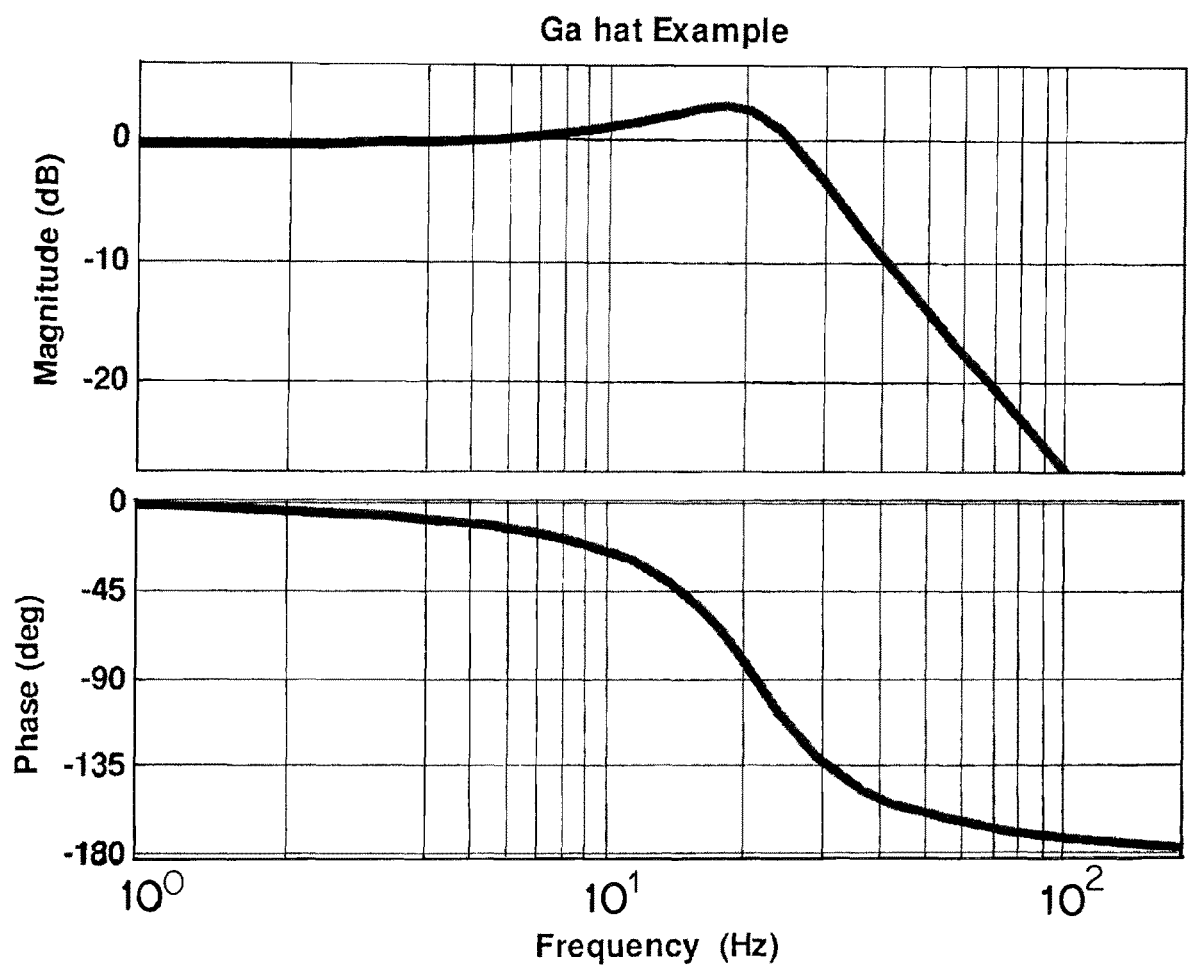

A plot of the magnitude and phase of an exemplary transfer function $\hat{G}$ is shown in FIG. 3d.

Figure 4A:
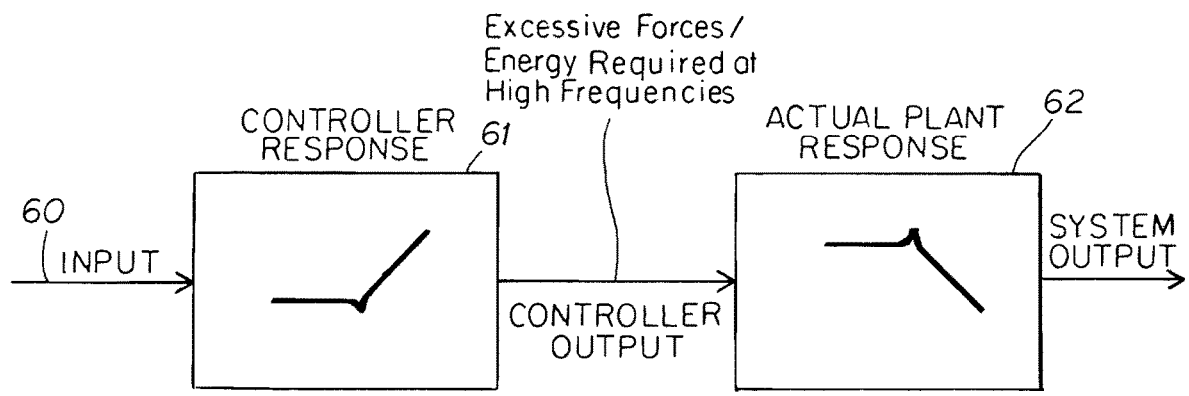

FIG. 4a illustrates the block diagram of the implementation of an idealized controller with an actual actuator.

Figure 4B:
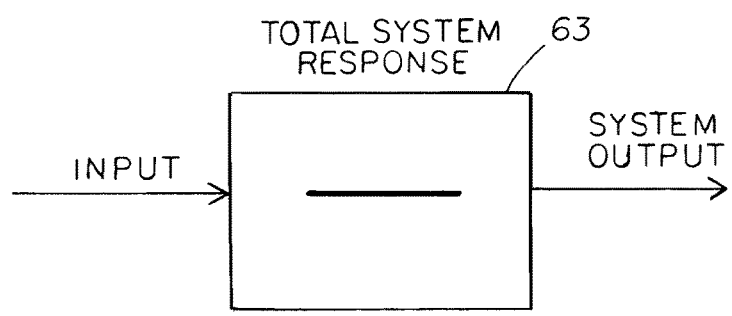

FIG. 4b illustrates the block diagram of FIG. 4a with a representation of the combined of the idealized controller and an actual actuator.

Figure 5A:
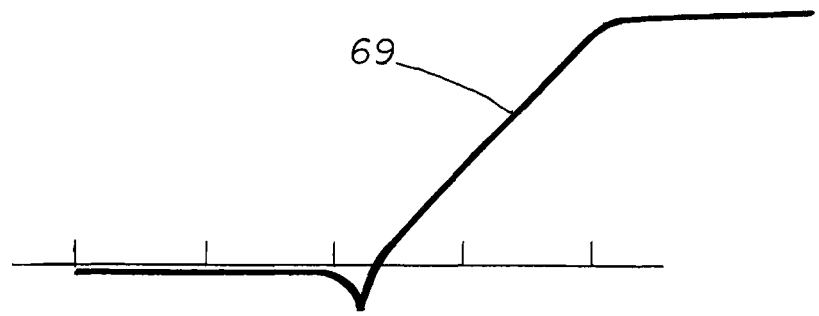

FIG. 5a shows a Bode plot of the modified inverse transfer function of an actuator model.

Figure 5B:
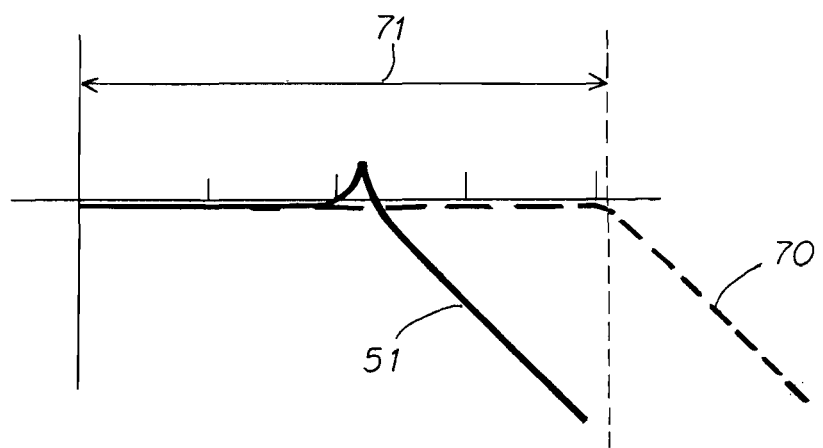

FIG. 5b shows a comparison of the Bode plots of the original and improved actuator system.

Figure 5C:
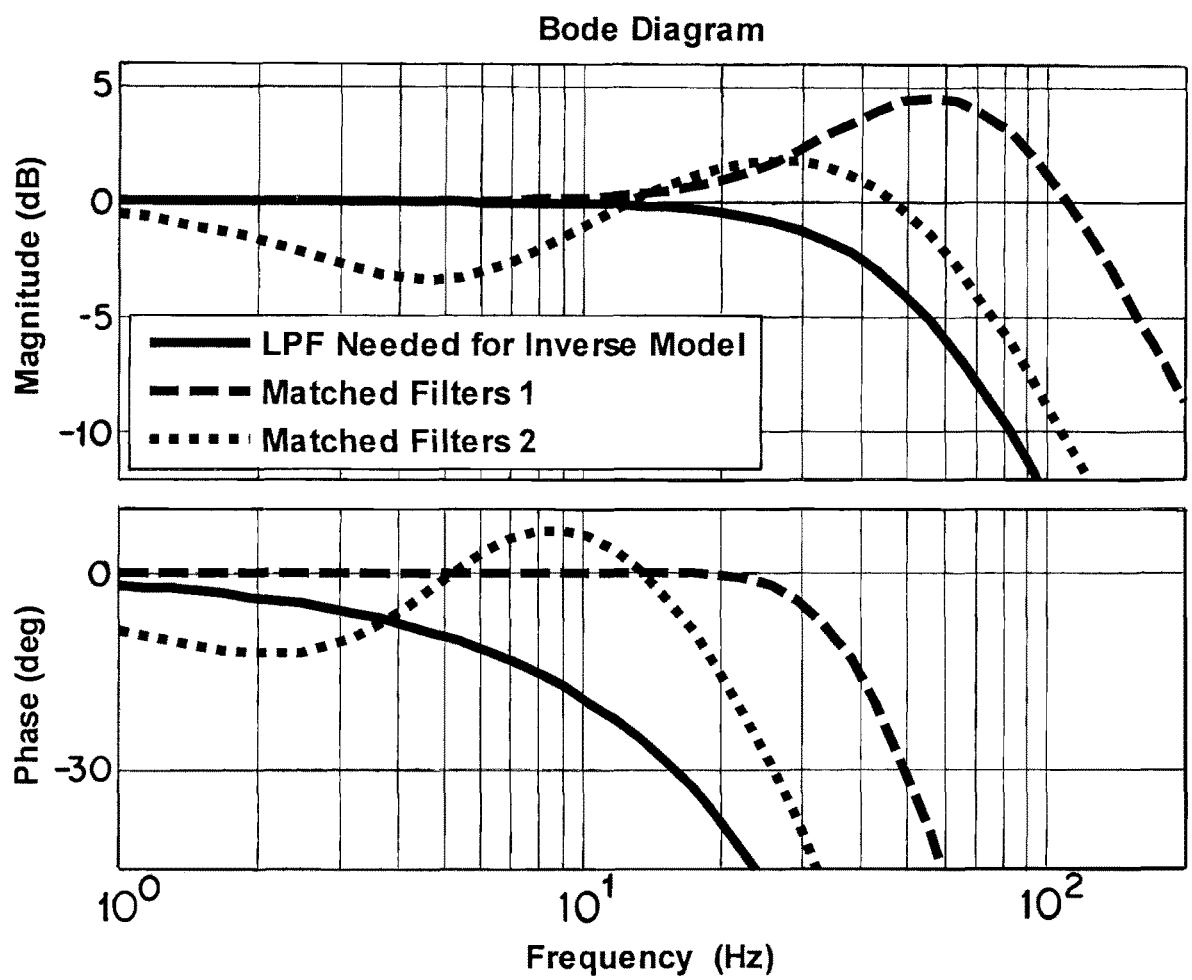

FIG. 5c shows the magnitude and phase response of an exemplary low pass filter and cascaded low pass filter and two different exemplary compensation filters, respectively.

Figure 5D:
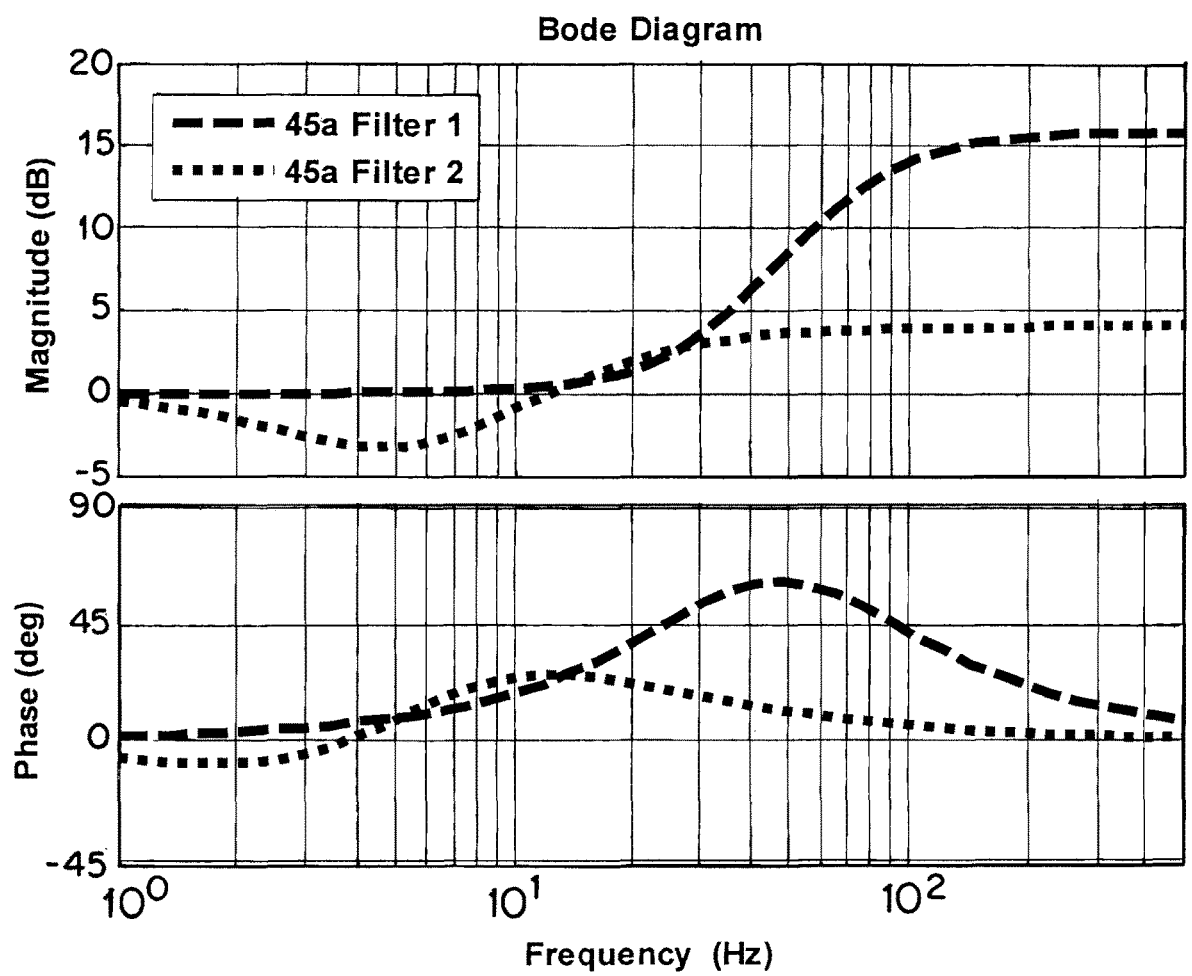

FIG. 5d shows the magnitude and phase response of two exemplary compensation filters.

Figure 6A:
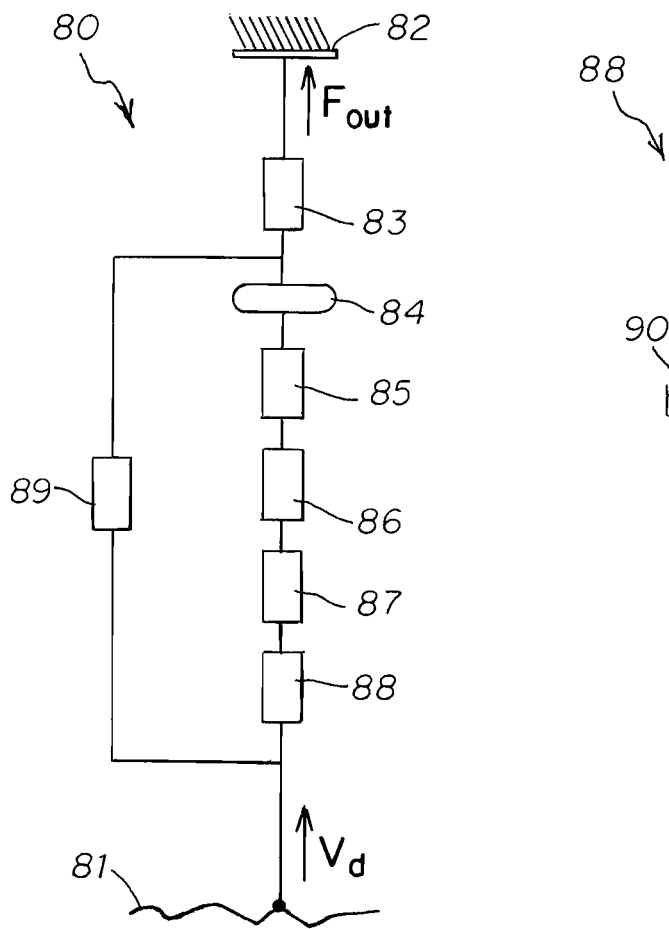

FIG. 6a illustrates a physical model for an electro-hydraulic active suspension actuator system.

Figure 6B:
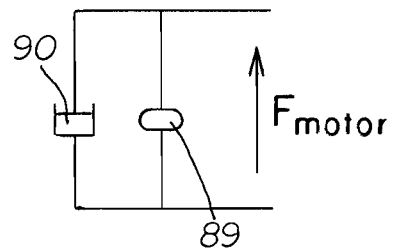

FIG. 6b shows the sub-model for a component of the physical model in FIG. 6a.

Figure 7:
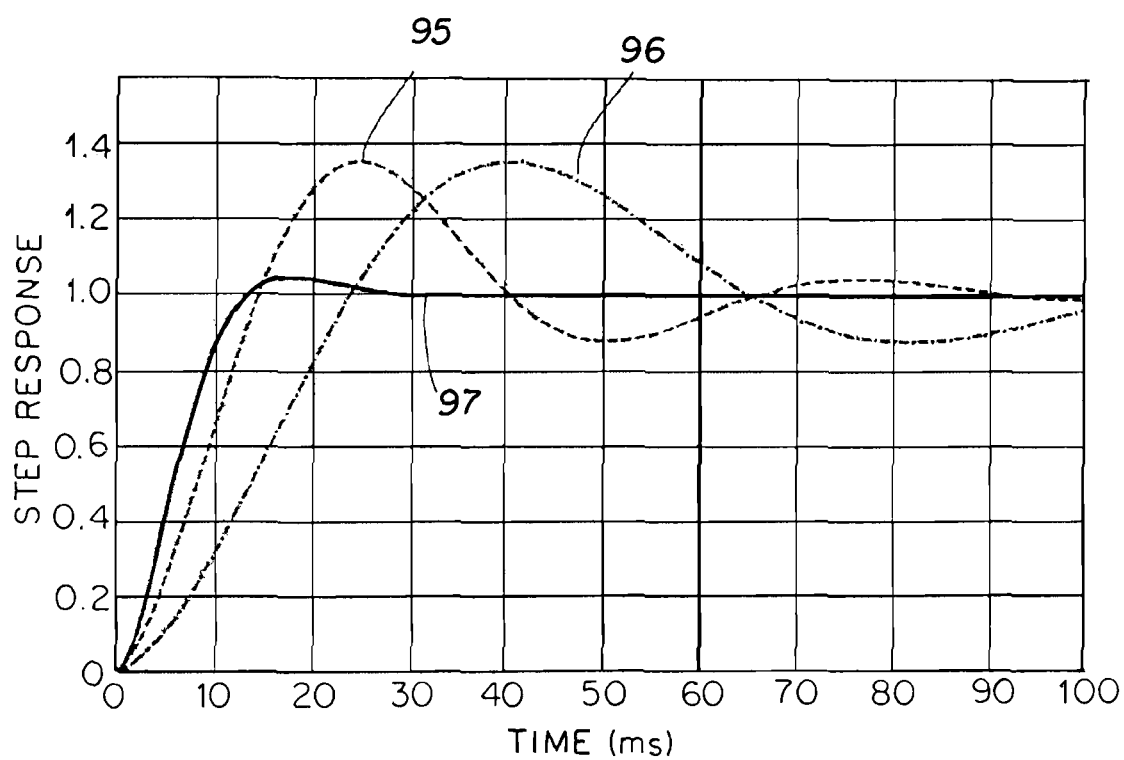

FIG. 7 shows the effects of increasing system compliance and of introducing compensation on the step function response of an electro-hydraulic active suspension actuator system.

DETAILED DESCRIPTION OF EMBODIMENTS

Certain exemplary embodiments will now be described to provide an overall understanding of the principles of the structure, function, manufacture, and use of the system and methods disclosed herein for an actuator system. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention is defined solely by the claims. The features illustrated or described in connection with one exemplary embodiment may be combined with features of other embodiments and the features may be used individually, singularly and/or in various combinations. Such modifications are intended to be included within the scope of the present invention.

In one embodiment an actuator system interfaces between two or more elements of a structure, at least one of which is affected by internal and/or external stimuli. The actuator system may also respond to commands that are intended to affect the relative motion of two or more elements of the structure.

According to another aspect, an active suspension actuator system interfaces between the unsprung mass of a vehicle (such as, for example, a wheel) and the sprung mass of the vehicle (such as the vehicle body). The actuator system controller may, for example, be used to control the relative motion between the two masses, at least one of which may interact with the surroundings.

Control systems may be feedforward systems, feedback systems or systems that comprise feedforward and feedback elements. Feedforward actuator controllers may be preferred because they are typically safer and more predictable (for example, due to reduced possibility of instability), less expensive (for example, because fewer sensors are required), and faster. However, feedback control systems may also be used.

In certain configurations and under certain circumstances control of active suspension actuator systems may be complicated by, for example, the inherent compliance, inertia, damping, stiction, dynamic friction, latency, and other dynamics of one or more elements of the actuator system. For example, in the case of an electro-hydraulic actuator, the system may comprise a damper with an inner volume that comprises a compression volume and an extension volume. These volumes typically contain a quantity of fluid, typically hydraulic liquid. Also included may be a hydraulic machine, constructed to operate as a hydraulic motor and/or a hydraulic pump, that may be configured to exchange hydraulic fluid with the compression and extension volumes.

In some embodiments, an electrical machine is constructed to operate as an electric motor and/or an electric generator, may be operatively coupled to the hydraulic machine by means of a shaft to form an integrated power unit. The hydraulic machine may be a gerotor that can be used to supply fluid under pressure to either the compression volume or the extension volume in order to apply a force on the piston in the compression or the extension directions. Alternatively, the gerotor may receive fluid under pressure from the compression or extension volumes and effectively absorb energy imparted to the piston, for example, by the surroundings. This fluid imparts a rotary motion to the gerotor that is, in turn, transmitted to the generator.

The actuator may be interposed between a wheel assembly and a vehicle body, where it may experience induced motion. As indicated, the actuator may also be exposed to damping and active forces induced by the hydraulic machine in both the compression and extension directions.

However, an active suspension actuator may exhibit inherent compliance, for example, because of the compressibility of the hydraulic fluid. The inertia of one or more elements of the actuator system, such as for example, the electric motor rotor and attached shaft of the hydraulic machine, may induce forces in the system that can adversely affect system response, for example, to an internally commanded input (e.g. a commanded torque on the electric motor) and/or an externally induced input (e.g. perturbations transmitted to the actuator from a road surface).

It may also be desirable to intentionally increase the compliance of an actuator (i.e. decrease its stiffness). For example, active suspension actuator systems may generate objectionable levels of hydraulically induced acoustic noise. In order to mitigate such noise, one or more accumulators, such as for example a pneumatic accumulator, or other compliant devices may be introduced in the force path in order to attenuate the level of acoustic noise. However, the introduction of such devices may have the side-effect of further increasing the compliance of the actuator system, which in turn may make it more difficult to control.

Compliance and inertia make the control of the dynamics of an actuator system more difficult. Compliance and inertia inherently affect how quickly forces can be applied to the piston in the hydraulic actuator in order to respond, for example, to various stimuli and/or changes in controller commands.

The performance of systems, such as active suspension actuator systems, may also be affected by various types of delays, such as for example, sensor delays. Such systems typically rely on one or more sensors of various types to gather information about their surroundings. However, typically, significant delays are present between the time of exposure of a sensor to a stimulus and an output that is effectively indicative of the magnitude of the stimulus. A delay may also be introduced by the operating speed of a digital controller. For example, if the controller is operating at 1 kHz, it means that updates to the system cannot occur at a rate faster than once per millisecond.

Systems, such as for example, an active suspension actuator, may be exposed to the effects of external stimuli, such as for example, the velocity of a wheel induced by road surface irregularities. The controller may also command the actuator to apply a desired force between the vehicle body (for example at the top mount of the actuator) and the wheel. In one aspect the actuator and controller may be configured and constructed such that a disturbance of the wheel results in no change in force at the top mount. Additionally, the actuator and controller may be configured and constructed such that a particular force requested by the controller is applied at the top mount by the actuator with the desired magnitude and timing.

It is therefore desirable that an active actuator system anticipate and account for, to the greatest extent possible, the effects of actuator dynamics. The system may anticipate, for example, the effects of factors, such as compliance and inertia, based on the characteristics of the stimuli and controller commands and the state (estimated or sensed) of the hydraulic actuator (for example, the pressure of an accumulator in the hydraulic circuit, temperature of one or more elements of the actuator, velocity of the actuator, and/or position of the vehicle relative to the road). These characteristics may include the frequency content of the stimuli and/or the command parameters.

In another aspect, the controller is developed based on the assumption that the stimuli and the command parameter(s) have independent effects on the system, such as for example in a linear time invariant system, such that their independent effects can be superimposed.

In another aspect, the system's transfer functions that relate the system output to a command input are modeled. These models may be empirically derived and/or based on scientific principles. Furthermore, an inverse transfer function may also be determined such that the product of the actual system transfer function and the modeled inverse system transfer function produces an output that is substantially equal to a given input.

In another aspect, the models are used to estimate the performance of the system that comprises sub-models that define the performance of one or more components of the actuator system. These transfer functions of these components may also be used to develop the necessary inverse transfer functions.

Each sub-model may be linear, nonlinear or piecewise linear over a portion of, or over the entire operating range. In some embodiments the performance of non-linear components may be approximated by linearized models.

The models may also be adaptive. System characteristics may be affected by wear or other changes. For example, as the system ages, its characteristics may change due to leakage of liquid from the hydraulic circuit and/or gas leakage from certain accumulators. System characteristics may also be affected by other parameters, for example environmental influences such as system operating temperature. Since the effects of such changes frequently cannot be determined a priori, in some embodiments one or more of the models may be adaptive. Models may be adapted, for example, automatically by using measurements taken during system operation. For example, in some embodiments, models may be adapted by altering coefficients, tables and/or other parameters in the control system based on a predetermined function of one or more sensed parameters (such as for example, temperature from a thermocouple, or predicted weight/loading of a vehicle). Alternatively or additionally, in some embodiments the adaptive model may be self-learning, wherein control system parameters are dynamically optimized. For example, models may self-learn by introducing known or predetermined stimuli, internal to the overall structure. For example, a first actuator system in the structure may be used to induce a response in a second actuator system. Alternatively or additionally, one or more actuators may be used to induce a response in the system which is monitored by one or more sensors, when there is no appreciable external stimulus. Since with this arrangement both the input(s) and the output(s) would be known, the information could be used to calibrate and/or adapt one or more of the actuator system component models. In some embodiments, the adaptive model may use a Kalman filter structure to adapt its parameters. In some embodiments, the adaptive system may estimate the response to a given input at other intermediate sensors, compare the measured response to the estimated response, and adapt parameters as needed in order to improve the correlation of measured to estimated system behavior.

The inventors herein have recognized that the inherent dynamics (such as compliance, mass/inertia, friction, parasitics, etc.) of one or more components of an actuator system may interfere with its effectiveness, for example, in a suspension system. The response of the actuator to various stimuli and the commands of the system controller may be adversely affected by these dynamics.

Figure 1:
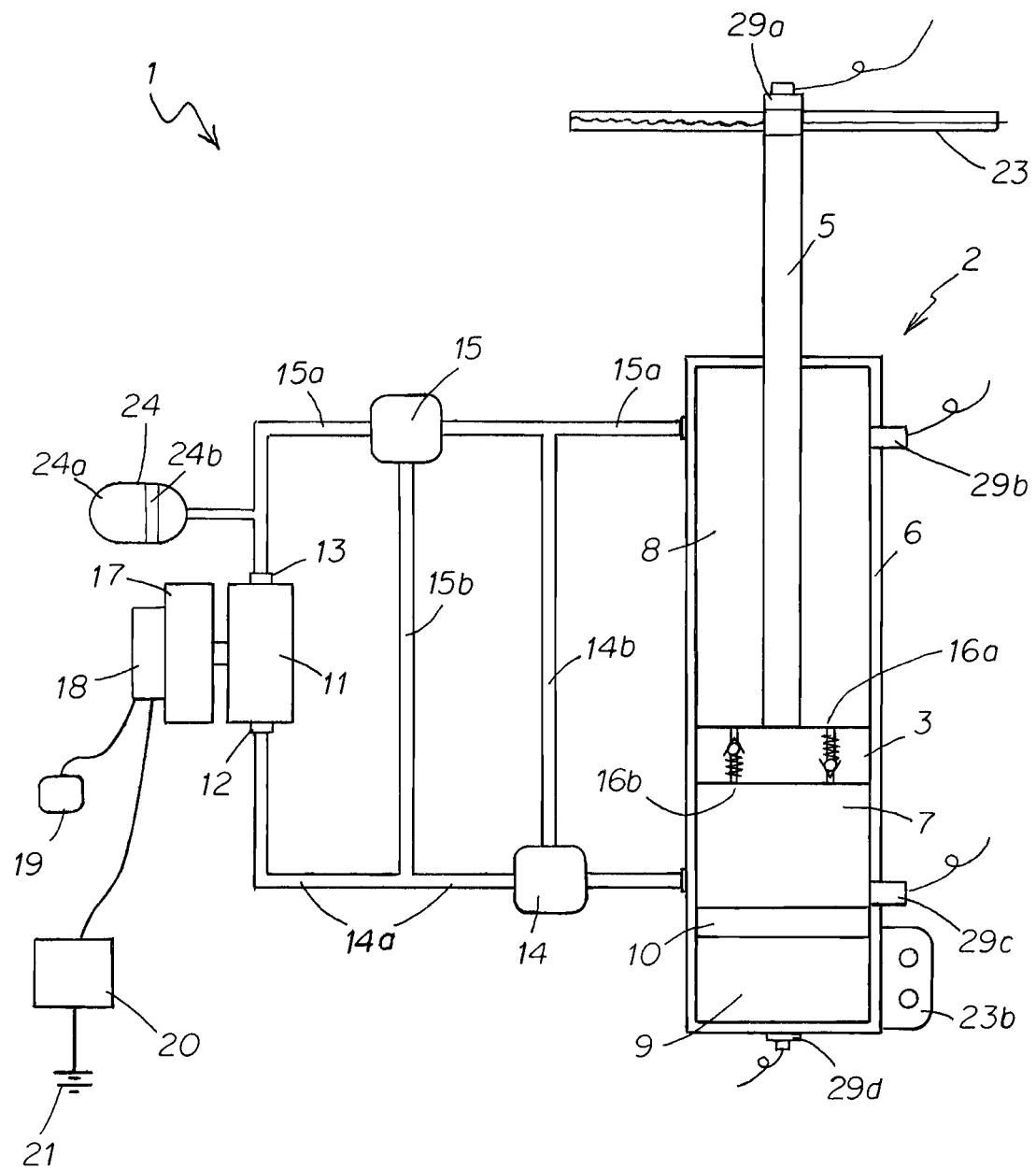
FIG. 1 shows a schematic of an embodiment of an actuator system.

FIG. 1 illustrates an aspect of an embodiment of the hydraulic circuit of an electro-hydraulic active suspension actuator system 1 comprising an actuator 2, which includes piston 3 with piston rod 5. The actuator 2 may be attached to the vehicle at top mount 23, and the wheel assembly (not shown) with the attachment flange 23b. Piston 3 is slideably received in actuator housing 6 and divides its internal volume into compression volume 7 and extension volume 8. The compression volume is compressed by the piston 3 when the piston moves further into the housing while the extension volume is compressed when the piston moves out of the housing. In some embodiments accumulator (reservoir) 9 is incorporated in actuator housing 6 and separated from compression volume 7 by floating piston 10. An additional or alternative accumulator or reservoir may be incorporated in the upper portion of actuator housing 6 and be separated from extension volume 8 by an annular piston (not shown). An accumulator may also be located external to the actuator housing 6 and configured to be in fluid communication with the compression volume or the extension volume. Accumulator 9 may be used to accommodate fluid expansion or contraction as a result of, for example, temperature change as well as the differential between the change in hydraulic fluid capacity of the compression volume compared to change in hydraulic fluid capacity of the extension volume as a result of the motion of the piston.

The hydraulic circuit of an active suspension actuator system 1 further comprises hydraulic motor/pump (HMP) 11 with a first port 12 and a second port 13.

FIG. 1 illustrates the use of bypass valves to prevent damage to the HMP due to over-speeding. For example, if the actuator 2 is being compressed at an excessive rate, at least a portion of the fluid flowing out of the compression volume 7 may be bypassed so that it flows directly into the extension volume 8 without passing through the HMP. Fluid flowing out of the compression volume may be bypassed by bypass valve 14. Fluid flowing out of the extension volume may be bypassed by bypass valve 15. First port 12 of the HMP is in fluid communication with bypass valve 14 by means of conduit 14a. Second port 13 of the HMP is in fluid communication with second bypass valve 15 means of conduit 15a. Bypass valve 14 and bypass valve 15 are also in fluid communication with compression volume 7 and extension volume 8, respectively. When bypass valve 14 is actuated, at least some portion of the fluid flow leaving compression volume 7 is diverted back into extension volume 8 by means of conduit 14b. When bypass valve 15 is actuated, at least some portion of the fluid flow leaving extension volume 8 is diverted back to compression volume 7 by means of conduit 15b. In some embodiments the bypass valves 14 and 15 may be passive valves that are self-actuated when the velocities in conduits 14a and 15a, respectively, reach a certain threshold. The excessive rate may be defined by various constraints, such as for example, the maximum speed that can be tolerated by the HMP and/or the GEM.

Additionally or alternatively, blow-off valves may be used to prevent an over-pressure condition in the housing. For example, blow-off valve 16a may be used to limit the maximum pressure in the compression volume 7, while blow-off valve 16b may be used to limit the maximum pressure in the extension volume 8. Any convenient blow-off valve may be used including, for example, a spring-loaded check valve or a preloaded shim stack.

HMP 11 is operatively coupled with generator/electric motor (GEM) 17, which is used to both drive the HMP when it needs to be operated as a pump and to absorb energy when the HMP is functioning as a motor. In some embodiments the GEM may be a BLDC (brushless DC) motor, although any convenient electric motor/generator may be used.

Local electronic controller (LEC) 18 is used to operate the GEM in response to various measurements and/or the output of internal and/or external sensors. LEC 18 may be configured to operate, at least occasionally, independently of centralized power storage and/or control. The LEC may comprise, for example, one or more of a control circuit such as a data processor, data storage, and sensor(s) and energy storage such as, for example, batteries and/or capacitors. The control circuit of LEC 18 may be a digital circuit, such as a data processor (e.g., a microprocessor), an analog circuit, or a combination thereof.

The LEC 18 may also operate as part of a network and deliver data to and/or receive data from a vehicle control unit 19, vehicle sensors, communication systems, and one or more other active suspension systems. The LEC 18 may also exchange information and/or electric power with a centralized controller and/or energy storage/conditioning device 20 which may comprise, for example, a power storage capacitor, a battery, and a DC/DC voltage converter and power management system. The centralized controller and energy storage/conditioning device 20 may be configured to exchange electrical energy with a vehicle power storage device 21, such as for example, a battery, a capacitor, or a flywheel.

LEC 18 and/or vehicle control unit 19 may be implemented by any suitable type of circuitry, using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above. The LEC 18 may store information in any suitable type of memory such as nonvolatile or volatile memory, such as RAM, ROM, EEPROM, or any other type of computer-readable storage.

Typically, an HMP, especially if it is a positive displacement machine, may induce pressure ripple in the hydraulic circuit. This ripple may cause oscillations, for example, in piston 3 which may be transferred to vehicle body elements (not shown) by means of, for example, the top mount 23. These oscillations may result in objectionable levels of acoustic noise. A secondary accumulator 24 may be used to attenuate the pressure ripple. The secondary accumulator 24 is preferably configured to be in fluid communication with the hydraulic circuit, which in some embodiments may be at a point that is in close proximity to the HMP port that is furthest from the main system accumulator 9. In some embodiments, the secondary accumulator 24 is at least partially filled with a compressible material 24a that is more compressible than the hydraulic fluid used in the hydraulic circuit. The compressible material 24a may be a gas which in some embodiments may be nitrogen. Alternatively or additionally, the compressible material may be comprised of, for example, a closed-cell foam. The compressible material may be separated from the hydraulic fluid by, for example, piston 24b, or a flexible diaphragm (not shown). Alternatively, the compressible material may be sealed in a flexible bladder (not shown).

Various sensors may be used to measure various performance and environmental parameters for control and diagnostic purposes. For example, an accelerometer 29a may be used to measure the motion of and vibration in the piston rod 5. Pressure sensors 29b and/or 29c may be used to measure the pressure in the extension volume 8 and/or compression volume 7 respectively. In some embodiments, accelerometer 29d may be used to measure the acceleration induced in actuator housing 6 by external stimuli, such as wheel motion produced by road surface irregularities. A force load cell (not shown in the diagram) at location 29a, or a series of force sensors at the interface of the actuator with the vehicle may also be used.

In some embodiments, two or more system components, for example, actuator 2, HMP 11, GEM 17, LEC 18, bypass valves 14 and 15, and/or buffer 24 be consolidated in a unit or single housing located at each of the four corners of a vehicle.

According to an embodiment of the present disclosure, a controller, such as LEC 18, for example, is configured to anticipate one or more aspects of the dynamics of a physical system at a given operating condition and compensate for it or them to achieve a desired output. For example, an active suspension actuator system may be interposed between a wheel of a vehicle and the vehicle body. When movement is induced in the wheel along the axis of the actuator, the suspension system may measure this movement (which may be defined by, for example, acceleration, velocity or displacement of a wheel, or force applied at a wheel attachment).

The controller of the system may then compute what force (or torque) the GEM needs to apply or absorb in order to achieve a desired force, velocity, acceleration and/or displacement at the points of attachment between the actuator and the vehicle, for example at the top and bottom mount of the vehicle. In this computation, the controller in some embodiments may, at least partially, compensate for one or more parameters that define the dynamics of the system, such as for example, compliance and inertia of one or more elements of the actuator system. Models of one or more elements may be used to predict system performance. Filters may be used to tailor the response of the system in the frequency and/or time domain.

Figure 2:
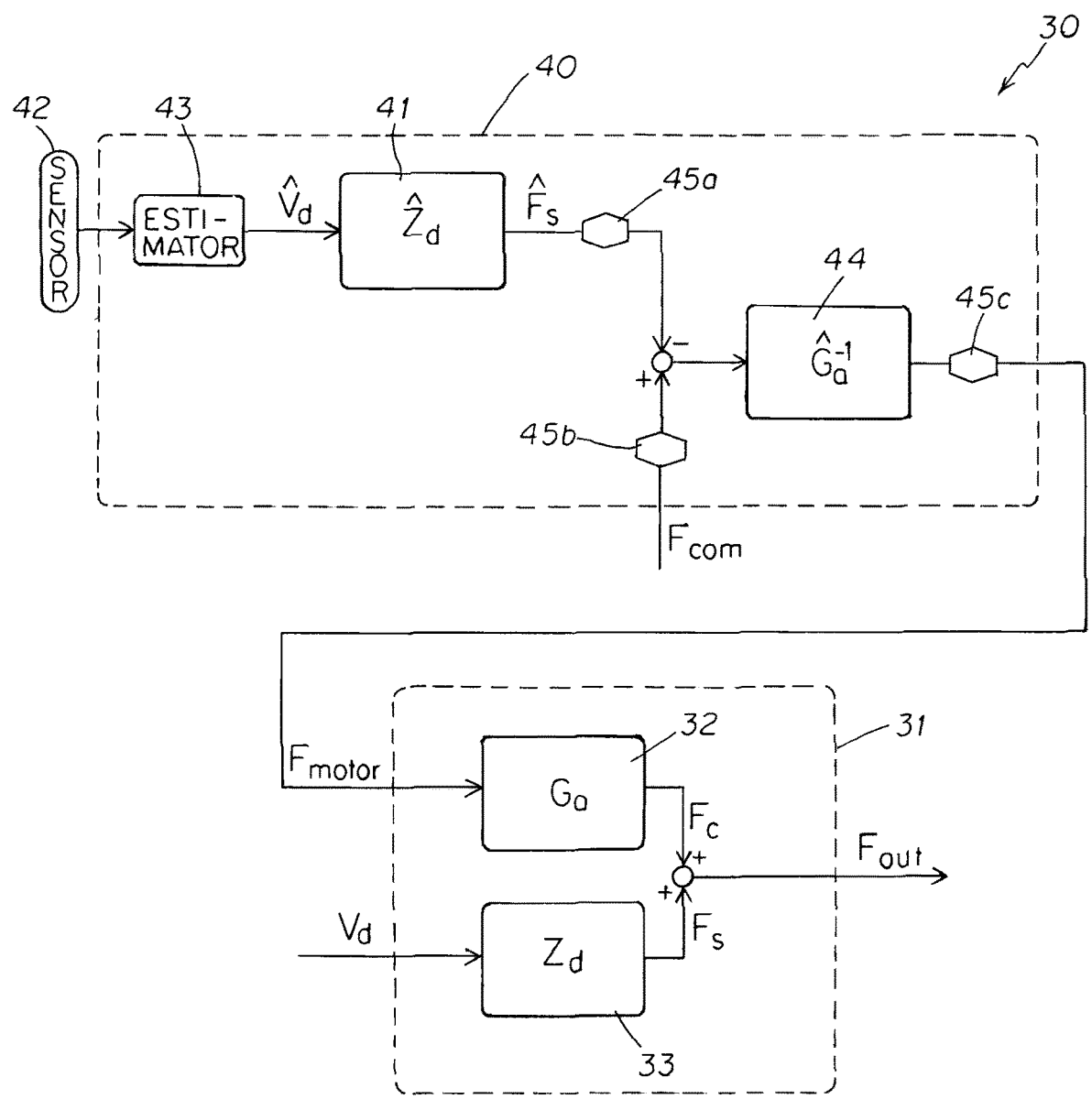

FIG. 2 illustrates an actuator control block diagram for an active suspension actuator system. Actuator 31 may represent an actuator of the active suspension actuator system which may be coupled to a wheel of a vehicle, such as actuator 2 of FIG. 1, for example. FIG. 2 shows an actuator controller 40 for controlling the actuator 31. Actuator controller 40 may represent any suitable controller, such as LEC 18, for example. Actuator controller 40 implements a control algorithm 30.

In some embodiments the implementation of the control algorithm 30 may result in a force output $F_{out}$ of actuator 31 which, for example, may be applied at a top mount of the suspension system.

The inputs to actuator 31 in the illustration in FIG. 2 are $V_d$ and $F_{motor}$. $V_d$ is the relative velocity between the points of attachment between at the top mount 23 (FIG. 1) and the wheel attachment flange 23b (FIG. 1). $F_{motor}$ is the force command output by the actuator controller 40 and provided to the GEM in the actuator 31. Instead of or in addition to force $F_{motor}$, for example, motor torque or motor winding current command may be provided to the GEM. The input parameter $V_d$ is a stimulus that is imparted to the actuator by the surroundings, for example, by the road surface imparting motion to the wheel that is along the axis of the actuator.

Block $G_a$ 32 represents the transfer function that relates the force that is commanded ($F_{motor}$) to the force that is applied at the top mount ($F_e$) in the absence of any interaction with the surroundings, such as the road surface, for example, when $V_d$ is zero or negligible.

Block $Z_d$ 33 represents the transfer function that relates the force $F_s$ applied at the top mount due to relative motion applied to the actuator $V_d$, when zero force is commanded to the GEM, such as when $F_{motor}$ equals zero or is negligible.

In certain embodiments the $F_{motor}$ command is produced by actuator controller 40. The input to the algorithm may include, for example, sensor 42 measurements and a desired or commanded force $F_{com}$, which may be a force to be applied at the top mount by actuator 31. Signal $F_{com}$ may be produced by any suitable controller, such as LEC 18 and/or vehicle control unit 19. Sensor 42 measurements may include, for example, wheel displacement, wheel velocity and/or wheel acceleration. Alternatively or additionally, the actuator 31 may produce output that is the velocity, acceleration and/or displacement of the point of attachment, or a force measured at a location in the vehicle, such as for example, the vehicle attachment points of the suspension links to which the actuator is connected. In some embodiments the actuator controller may employ a vehicle dynamics algorithm to perform, for example, body and wheel control for a vehicle.

In FIG. 2, $\hat{V}_d$ is an estimate of $V_d$ computed by estimator 43 based on one or more sensor measurements, such as for example, accelerometer 29d (FIG. 1). Alternatively or additionally, other sensors, such as for example, position sensors, displacement sensors, velocity sensors may be utilized. The estimator may combine multiple signals representing at least partially redundant data (e.g. velocity/position sensor data and accelerometer data) in order to produce a more accurate estimated sensor reading. This step may also include filtering to remove noise from sensor signals. In some embodiments, such filtering may operate without delay, wherein output from the estimator is not delayed with respect to the input from the sensor. For example, a peak rejection filter may reject a velocity reading that represents a higher acceleration than some pre-set threshold maximum acceleration since the last time step, and, for example, instead re-use the velocity from the last time step as the current velocity estimate. In some embodiments, erroneous sensor information may be rejected by using this process.

Block $\hat{Z}_d$ 41 is a transfer function based on one or more models of the system (e.g., FIGS. 6a and 6b) that estimates top mount force $\hat{F}_s$ as a result of input $V_d$ when no force or torque is produced by the GEM.

In FIG. 2 the measured state variable is velocity, and an estimate of force (e.g., top mount force) is produced based on a velocity estimate. However, any other convenient state variable may be measured and used in the algorithm, such as actuator force, which may be the force at the top mount or other acutator forces. In some embodiments, rather than estimating an actuator force based on measured velocity, the actuator force (e.g., top mount force, or other forces) may be measured and input to the algorithm in place of $\hat{F}_s$.

Transfer function $\hat{G}_a^{-1}$ 44 is an estimation of the inverse of transfer function $G_a$. FIG. 3a shows the approximate response $G_a$ 51 of an embodiment of a suspension system actuator in the frequency domain 50. The response shows a peak at a resonance followed by a drop-off at higher frequencies. The behavior of the idealized inverse transfer function 52 $G_a^{-1}$, of the system in FIG. 3a, is shown in FIG. 3b. The product of $G_a$ and the idealized inverse transfer function $\hat{G}_a^{-1}$ produces the idealized flat response 53. The flat response 53 across all frequencies indicates that the $G_a^{-1}$ perfectly cancels the response of $G_a$ at all frequencies.

A plot of the magnitude and phase of an exemplary transfer function $\hat{Z}_d$ is shown in FIG. 3c.

A plot of the magnitude and phase of an exemplary transfer function $\hat{G}$ is shown in FIG. 3d.

One or more filters 45a, 45b, and 45c may be used to filter various signals in the actuator controller to shape the behavior of $F_{motor}$ in the frequency and/or time domains in order to avoid unacceptably high $F_{motor}$ demands. The filters may be digital filters, analog filters or a combination of digital and analog filters. Filters may also be used to shape the response, because for example, performance in some frequency ranges may be more important than others. For example, in a vehicle occupants typically more readily perceive vibrations in 4-10 Hz range. Filters may be used to, for example, shift energy from certain critical frequency ranges to other less critical ones. Nonlinear filters, such as rate limiters may also be used.

If superposition is a valid approximation of the physical system (the plant), then:

Output $F_{out}$ of the active suspension actuator algorithm shown in FIG. 2 is determined by:

$$F_{out} = Z_d * V_d + G_a * F_{motor} = Z_d * V_d + G_a * \hat{G}_a^{-1}(F_{com} - \hat{Z}_d * V_{est}) \quad \text{Eq.1}$$

such that:

$$F_{out} = Z_d * V_d + G_a * \hat{G}_a^{-1} * F_{com} - G_a * \hat{G}_a^{-1} * \hat{Z}_d * V_{est}$$

If $G_a * \hat{G}_a^{-1} = 1$ $$F_{out} = Z_d * V_d + F_{com} - \hat{Z}_d * V_{est}$$

$$F_{out} \approx F_{com}$$

where,
$Z_d = F_{out}/V_d$ transfer function (at zero hydraulic motor/pump torque)
Accounts for inertia effects
$\hat{Z}_d$ = Model of $Z_d$
$\hat{G}_a$ = Model of $F_{out}/F_{cmd}$ transfer function (at $V_d$=0, locked damper)
$\hat{G}_a^{-1}$ = Model of inverse transfer function of $\hat{G}_a$ However, due to variations in system behavior based on a variety of effects, such as for example, manufacturing tolerances, system nonlinearities, environmental factors, or the desire to minimize processing overhead (such as microprocessor constraints), a non-ideal response may result at certain frequencies. For example, the models used to construct $\hat{G}_a^{-1}$ may be linear or nonlinear approximations. Different models may be necessary for different input frequency ranges. These models may also vary as a function of operating conditions and may have to be adapted for example, as operating conditions change or with the age of the system. In many embodiments, effective approximations of $\hat{G}_a^{-1}$ may suffice to deliver considerable performance improvements in the actuator by cancelling the majority of the undesirable system dynamics. This may be true over particular or critical frequency ranges. However, in order to improve the overall response, the individual sub-models used to build the $\hat{Z}_d$ and $\hat{G}_a^{-1}$ transfer functions may need to account for one or more of the above effects. These may, for example, be achieved by using empirical and/or fundamental models of the behavior of one or more individual elements or groupings of elements of the system under various operating conditions.

Eq. 1 may be utilized with linear or non-linear models as long as the principle of superposition is applicable. Nonlinear models may be superimposed if there is not substantial interaction between them. In the determination of the inverse transfer function $\hat{G}_a^{-1}$, it may be necessary to linearize the component models involved.

An uncontrolled actuator system is defined as an actuator without a commanded input or a zero command input. A non-ideal actuator system is defined as an uncontrolled actuator that exhibits a non-zero transmissibility to an external stimulus. For example, a non-ideal actuator system would produce a non-zero force $F_{out}$ (FIG. 6) due to the effect of a road stimulus $V_d$ (FIG. 6) when the GEM is commanded to not produce any force. The accuracy of an actuator system is defined as how closely the output of the actuator approximates the command input As is shown in FIG. 3b, the gain of the inverted transfer function $G_d^{-1}$ may increase without limit. FIG. 4a illustrates the frequency response of an ideal controller 61 that cancels the dynamics of the actual plant 62, at all frequencies, of input 60. FIG. 4b illustrates the response, in the frequency domain, of the combination 63 of the controller and the actual plant. The unbounded gain of the inverse transfer function $G_a^{-1}$ may present a hurdle to the implementation of such a system. If high frequency content of the input from, for example, noise in sensor measurement, is allowed to reach controller 61, the controller would request excessive (possibly unattainable) forces from the plant 62. This could result in adverse effects, such as highly inefficient operation, objectionable levels of noise, and damage to the system.

However, the operation of the controller may be modified as illustrated in FIG. 5a. For example, the frequency response 69 of the controller may be altered by introducing one or more filters, preferably low pass filters, at one or more points in the controller. This will induce a roll off in the controller transfer function limiting the gain at elevated frequencies. In this manner, the inverse transfer function 52 shown in FIG. 3b is modified to obtain the inverse transfer function shown in FIG. 5a.

The effect of the roll-off in the inverse transfer function is shown in FIG. 5b. The flat range of the combined system transfer function 70 is extended beyond the critical range 71. However, the effect of the roll-off, which may be observed at higher frequencies, limits the gain of the controller at these frequencies, and avoids the request for excessive forces by the controller. In the case of an active suspension system of an automobile, the critical range may be extended to approximately 10 Hz, more preferably 20 Hz, yet more preferably 40 Hz.

In some embodiments, filter 45c (FIG. 2) may be a low-pass filter. In some embodiments, the low-pass filter has an order that is at least as high as that of $G_a$ to counter the inverse of $G_a$ effectively. For example, if $G_a$ has a second-order transfer function, the low-pass filter may be second order or higher. Plots of the magnitude and phase of an exemplary low-pass filter for filter 45c are shown in FIG. 5c (solid lines). In some embodiments, the second-order low-pass filter may have a corner frequency between 30 and 70 Hz, such as between 40 and 60 Hz, e.g., 50 Hz.

The inventors have recognized and appreciated that implementing filter 45c as a low-pass filter may introduce phase into the system that may adversely impact the performance of the control system, for example, in the critical frequency range described above. FIG. 5c shows the low pass filter (solid line) has too much phase to provide desired system performance between 10 Hz and 15 Hz. To address this problem, one or more of filters 45a, 45b and 45c may be designed to compensate the phase.

In some embodiments, desirable response characteristics of the filter(s) are the following. In some embodiments, the filter(s) may have a low-pass characteristic at high frequencies. At frequencies where a wheel may be resonant (10-15 Hz), the filter(s) may have a magnitude response at or close to unity, and a phase that is relatively close to 0, such as less than 10 degrees or less than 5 degrees.

In a first example, filter 45c may be implemented as a low pass filter as described above, and filter 45a may be designed to compensate the phase of filter 45c. Filter 45b is optional and may be removed or set equal to unity. Filter 45a may be a compensation filter to compensate the phase of the low pass filter. The compensation filter may be a lead filter or a lag-lead filter, for example. FIG. 5d shows plots of phase and magnitude of two exemplary filters 45a—labeled Filter 1 (dashed line) and Filter 2 (dotted line). The magnitude and phase response of cascaded filters 45a and 45c, with the two different examples for filter 45a, is shown in FIG. 5c in the dashed and dotted lines, corresponding to the cascaded response of the low pass filter and Filter 1 (dashed line) and the cascaded response of the low pass filter and Filter 2 (dotted line). The compensation filter offers the flexibility to improve performance between 10-15 Hz at the side effect of the response in other frequency bands. The dashed plot for Filter 1 allows much more high frequency amplification. The dotted plot for Filter 2 allows magnitude distortion outside of the 10-15 Hz range.

In a second example that can achieve the same result, filter 45c may include a low pass filter as discussed above (FIG. 5c) as well as the phase compensation filter discussed above (FIG. 5d) with the cascaded characteristics shown in FIG. 5c. The low pass filter and phase compensation filter may be separate filters or combined into the same filter. Filter 45a is optional in this example and may be removed or set equal to unity. To achieve the same result as the first example, filter 45b may have the inverse transfer function of the phase compensation filter implemented in filter 45c.

FIG. 6a schematically illustrates the hydraulic actuator system embodiment model represented by Eq. 1. Road surface 81 introduces an external stimulus $V_d$ to the actuator system 80, while the actuator system applies force $F_{out}$ to the vehicle body 82. The embodiment of the actuator in FIG. 6a comprises a number of modeled mechanical impedances, such as for example: top mount 83, damper piston and piston rod mass 84, fluid 85, secondary accumulator 86, damper leakage 87, and HMP 88 which are in series with each other and in parallel with the damper impedance 89. This transfer function of the entire system represented in FIG. 6a may be determined empirically by, for example, using an actuator dynamometer to determine the relationship between $F_{out}$ and $V_d$. The inventors have determined that the accuracy of such a transfer function can be significantly improved by developing individual models of each of or sub-groupings of the individual impedances. The performance of each model may be linear or non-linear and may be characterized empirically and/or by using mathematical simulations.

Each impedance in FIG. 6a may comprise further sub-models. For example, the HMP impedance 88 may be modeled by a parallel arrangement of an inertial element 89 and damping element 90. For example, if the HMP is a gerotor, the damping element 90 may be used to simulate the leakage and frictional behavior of the fluid past the gerotor elements while inertial element 89 may be used to model the rotational inertia of the gerotor, the rotational elements of the GEM, and the connecting shaft. $F_{motor}$ represents the force applied by the HMP when it is commanded to produce force $F_{out}$ by the controller.

FIG. 7 illustrates the force at the top mount in response to a step in commanded force in the time domain, for an electro-hydraulic active suspension system. Curve 95 shows the step response of $G_a$ without the effect of a buffer. Curve 96 shows the step response when the system compliance has been increased as a result of the inclusion of an accumulator, such as a device used to reduce hydraulically-generated acoustic noise. Curve 97 shows the step response when increased compliance of the system is mitigated by using the control algorithm illustrated in FIG. 2. FIG. 7 illustrates that the response time of the system, with a secondary accumulator and compliance compensation, is faster than the system without the effect of a secondary accumulator. Therefore, the control system compensation may be used to more than eliminate the effect of increased compliance of the secondary accumulator on the step response of the system.

The embodiments described relate primarily to actuators of active suspension systems of vehicles. However, the disclosure is not limited to active suspension actuators and one of ordinary skill in the art would recognize that the system may be utilized in other applications. Other applications where the control system of FIG. 2 may be implemented include, for example, earth moving equipment, cranes, robots, elevators, platform stabilizers, flight control surface actuation systems and marine (for example, ships and submarines) control surface actuation systems. In such applications, the control system of FIG. 2 may be used to reduce the possibility of instability and at least partially isolating the system from external stimuli. Instability and susceptibility to external stimuli may have disastrous consequences in certain applications such as aircraft and marine vessels. In other applications, such as manufacturing robots where throughput may be a key consideration, actuators may need to move at very high rates to maximize throughput. Lightweight materials and lighter electric motors may be used to aid system response. However, such materials and power units make systems susceptible to external stimuli and instability that may be generated at high frequencies. Using a control system such as shown in FIG. 2 would increase the safety, reliability, and response of such systems.

What is claimed is:

1. A method for controlling an actuator, with a first point of attachment attached to a first element of a structure and a second point of attachment attached to a second element of the structure, wherein the actuator includes an electric machine operatively coupled to a hydraulic machine, said method comprising:
   (a) utilizing at least one motion sensor to sense a relative motion between the first point of attachment and the second point of attachment, wherein the relative motion is induced by an external stimulus applied to the second element;
   (b) with a predetermined transfer function, that relates force applied by the actuator at the first and the second attachment points to relative motion between the attachment points when the electric machine is commanded not to produce a torque, determining a value of a first force, based on the relative motion in (a);
   (c) determining a desired output force to be applied to the first element by the actuator in response to the external stimulus;
   (d) based at least in part on the value of the first force determined in (b) and the desired output force, providing a command to the electric machine with the controller; and
   (e) in response to the command in (d), operating the electric machine, to apply the desired output force, to the first element, with the actuator.

2. The method of claim 1, wherein the electric machine is an electric motor, wherein the hydraulic machine is a hydraulic pump, wherein providing the command to the electric machine in (d) comprises applying the commanded torque to the hydraulic pump of the actuator with the electric motor.

3. The method of claim 1, wherein the electric machine is an electric motor, wherein the hydraulic machine is a hydraulic pump, wherein providing the command to the electric machine in (d) comprises applying a commanded current to one or more windings of the electric motor.

4. The method of claim 1, wherein (d) comprises:
   subtracting the determined value of the first force from the desired output force determined in (c) to obtain a differential force; and
   inputting the differential force into an inverse transfer function of the actuator to determine the command.

5. The method of claim 1, wherein the first element is part of a sprung mass of a vehicle and the second element is part of an unsprung mass of the vehicle.

6. The method of claim 1, wherein the at least one motion sensor includes an accelerometer, a velocity sensor, and/or a position sensor.

7. The method of claim 6, wherein utilizing at least one motion sensor to sense relative motion between the first element and the second element comprises sensing an acceleration of the first element relative to the second element, a velocity of the first element relative to the second element, and/or a change in position of the first element relative to the second element.

8. The method of claim 5, wherein the external stimulus is a road surface induced perturbation.

9. The method of claim 8, wherein the road surface induced perturbation is a velocity of a wheel induced by a road surface irregularity.

10. The method of claim 1, wherein the predetermined transfer function is at least partially empirically based.

11. The method of claim 1, wherein the predetermined transfer function is at least partially based on a model of at least one component of the actuator.

\* \* \* \* \*